Patented Oct. 17, 1950

2,526,171

UNITED STATES PATENT OFFICE 2,526,171

PREPARATION OF BETA-METHYL-CYCLO-PENTADECANONE

Max Stoll, Geneva, Switzerland, assignor to Firmenich & Co., successeurs de la Société Anonyme M. Naef & Cie, Geneva, Switzerland, a corporation of Switzerland No Drawing. Application July 10, 1947, Serial No. 760,105. In Switzerland September 2, 1946

6 Claims. (Cl. 260—586)

The present invention relates to a new process for preparing $\beta$-methyl-cyclo-pentadecanone. This compound, which is identical with racemic muscon, is an important primary material in perfumery. It was hitherto prepared synthetically from cyclopenta-decanone (Helv. chim. acta 17, 1309 1934), from $\beta$-methylated dinitril of thapsic acid (A. 512, 162 1934) or from ethylic $\omega$-brom-$\beta$-keto-$\delta$-methyl-hexadecanoate (B. 75, 1197 1942), all of these methods using primary materials that are very expensive or difficult to obtain.

The process to which the present invention relates is based, on the contrary, on the utilisation of a new and easily available primary material, viz. the 1.12-diacetyldodecane (Formula I):

I      $CH_3CO(CH_2)_{12}COCH_3$

The latter can, indeed, be prepared either from (i) sebacic acid ester (Formula II) by conversion into decamethylene glycol (Formula III) in the usual way (Helv. chim. acta 9, 265 1926), then into dibromodecane (Formula IV), followed by condensation with aceto-acetic acid ester so as to obtain the compound according to Formula V and by ketonic splitting, according to the following schema:

$CH_3OOC(CH_2)_8COOCH_3 \rightarrow OH(CH_2)_{10}OH \rightarrow Br(CH_2)_{10}Br$
        II                        III              IV $CH_3COCH(CH_2)_{10}-CH-COCH_3 \rightarrow CH_3CO(CH_2)_{12}COCH_3$
        |                   |
      COOR     COOR
               V or from (ii) methylcyclohexanone (Formula VI), which is oxidised in $\delta$-acetylvaleric acid (Formula VII) and then electrolysed in the presence of $\omega$-acetylpelargonic acid (Formula VIII) obtained from undecylenic acid, according to the following schema:

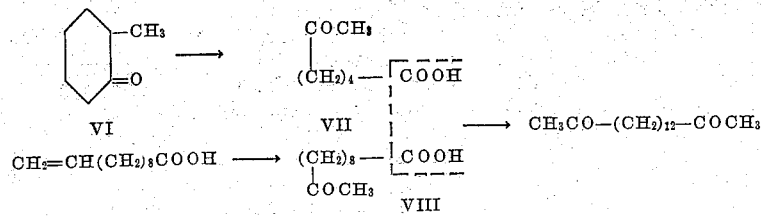

or by still other methods.

Conversion of the diacetyldodecane (Formula I) into $\beta$-methyl-cyclo-pentadecanone (Formula XI) according to the process of the invention is effected very simply by intramolecular condensation, yielding the compound of Formula IX, followed by dehydration, yielding the compound of Formula X, the latter being then hydrogenated, preferably in the presence of a catalyst. The whole operation proceeds according to the following schema:

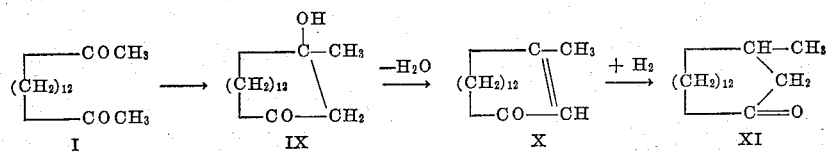

Theoretically, the intramolecular condensation may result in a ring with 13 or 15 members according to whether the keto-group reacts with a methylene group or with a methyl group.

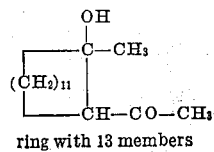

ring with 13 members $\longleftarrow CH_3CO-(CH_2)_{12}-COCH_3 \longrightarrow$

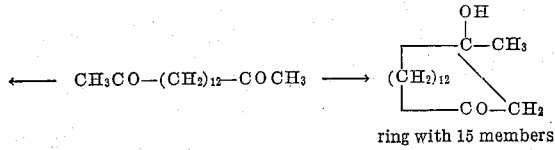

ring with 15 members

In practice, however, the 15-membered ring-product is chiefly obtained. This may be partly due to the fact that the 15-membered ring is formed more than four times as readily as its 13-membered rival. Of all the homologous ketones having a musk odour—i. e., having 15, 16 or 17 members in their ring—only the 15-membered one offers such a marked difference in its facility of formation as compared with that of its homologue having two members less in its ring. The 1.12-diacetyldodecane thus possesses a constitution especially favourable to an intramolecular ring-closing on the methyl group.

To facilitate intramolecular condensation, it is strongly recommended to employ the 1.12-diacetyldodecane in a very dilute state. The less active the condensing agent is, the more diluted the 1.12-diacetyldodecane should be. The condensing agents to be taken into account are those known to be able to condense methyl-ketones in general and, in particular, magnesium-bromides of alkyl-anilines and hydrids of sodium (NaH). As organic solvents, ethers may be used, such as sulphuric ether and its homologues, ketals, aromatic and aliphatic hydrocarbons, alcohols, etc., either pure or mixed.

Intramolecular condensation followed by dehydration yields the dehydrated product of condensation. By simple catalytic hydrogenation, this product is quantitatively converted into β-methyl-cyclo-pentadecanone.

*Example*

200 cc. of an ethereal solution of

BrMgN(CH₃)C₆H₅ containing 0.1 gramme-molecule of Mg and 0.11 gramme-molecule of methylaniline are introduced into 20 litres of absolute ether. Then into the boiling solution, over a period of 5 hours, 17 grammes of 1.12-diacetyldodecane with a melting-point of 82.5° C. is added. After cooling, 500 cc. of 11% hydrochloric acid are added. By washing with acid and water, the methylaniline is eliminated. The ethereal solution is then dried and the solvent distilled. 20 grammes of oily residues are obtained. These are extracted with petroleum ether to obtain 14 grammes of oil smelling strongly of musk and also of rose. 5 grammes of product remain insoluble; they consist of polymeric substances and of a little diacetyldodecane. On distillation, the 14 grammes of oil separate into two almost equal fractions, the first of which distils between 100–105° C. under 0.01 mm. of pressure and possesses the following physical constants:

$d_4^{22.0} = 0.94 \quad n_D^{22} = 1.498$

By catalytic hydrogenation, this first fraction is integrally converted into β-methyl-cyclo-pentadecanone, the semicarbazone of which melts at 138–140° C. The odour of this ketone is identical with that of muscon.

What I claim is:

1. A process for preparing β-methyl-cyclo-pentadecanone which comprises cyclizing 1.12-diacetyldodecane by intramolecular condensation to form β - methyl - β - hydroxy - cyclopentadecanone, dehydrating the β-methyl-β-hydroxy-cyclopentadecanone to β-methyl-cyclopentadecenone and then saturating by hydrogenation the β-methyl-cyclopentadecenone to β-methyl-cyclopentadecanone.

2. The process as defined in claim 1 in which the 1.12 - diacetyldodecane is intramolecularly condensed in a highly dilute solution thereof.

3. The process as defined in claim 1 in which the 1.12 - diacetyldodecane is intramolecularly condensed in a highly dilute solution thereof in an organic solvent.

4. A process as defined in claim 1 wherein the saturation is effected by catalytic hydrogenation.

5. A process as defined in claim 1 in which the intramolecular condensation is effected in the presence of a condensing agent.

6. A process as defined in claim 1 in which the intramolecular condensation is effected in the presence of BrMgN(CH₃)C₆H₅.

MAX STOLL.

REFERENCES CITED

The following references are of record in the file of this patent:

UNITED STATES PATENTS

| Number | Name | Date |
|---|---|---|
| 1,965,829 | Guinot | July 10, 1934 |
| 2,275,752 | Goldberg | Mar. 10, 1942 |
| 2,387,587 | Hunsdiecker | Oct. 23, 1945 |

FOREIGN PATENTS

| Number | Country | Date |
|---|---|---|
| 448,770 | Great Britain | Mar. 19, 1935 |

OTHER REFERENCES

Gilman, "Organic Chemistry," John Wiley & Sons, New York, 1938, vol. I, page 27.

Akeenova Chemical Abstracts, vol. 35, 6238–6240 (1941).